US006116138A

United States Patent [19]

Achten

[11] Patent Number: 6,116,138

[45] Date of Patent: Sep. 12, 2000

[54] PRESSURE TRANSFORMER

[75] Inventor: Peter A. J. Achten, Eindhoven, Netherlands

[73] Assignee: Innas Free Piston B.V., Breda, Netherlands

[21] Appl. No.: 09/125,337

[22] PCT Filed: Feb. 24, 1997

[86] PCT No.: PCT/NL97/00084

§ 371 Date: Mar. 10, 1999

§ 102(e) Date: Mar. 10, 1999

[87] PCT Pub. No.: WO97/31185

PCT Pub. Date: Aug. 28, 1997

[30] Foreign Application Priority Data

Feb. 23, 1996 [NL] Netherlands ............................ 1002430

[51] Int. Cl.$^{7}$ ................................ F01B 1/00; F16D 31/02

[52] U.S. Cl. ................................ 91/6.5; 60/419; 417/225; 91/472

[58] Field of Search ................................ 60/419; 91/6.5, 91/499, 502, 503, 508; 417/225

[56] References Cited

U.S. PATENT DOCUMENTS

| | | | |
|---|---|---|---|
| 2,550,405 | 4/1951 | Crosby | 417/225 X |
| 2,642,809 | 6/1953 | Born et al. | 91/6.5 |
| 2,845,030 | 7/1958 | Le Febvre et al. | 91/502 X |
| 2,881,706 | 4/1959 | Haynes et al. | 417/225 |
| 2,933,897 | 4/1960 | Toutant . | |
| 3,016,710 | 1/1962 | Kurz et al. | 417/225 |
| 3,054,261 | 9/1962 | Marette et al. | 60/418 |
| 3,139,905 | 7/1964 | Rosaen et al. | 60/419 X |
| 3,175,508 | 3/1965 | Smithson | 91/6.5 |
| 3,188,963 | 6/1965 | Tyler . | |
| 3,200,761 | 8/1965 | Firth et al. | 91/6.5 |
| 3,223,047 | 12/1965 | Toy . | |
| 3,253,410 | 5/1966 | Albers | 60/419 |
| 3,627,451 | 12/1971 | Kouns . | |
| 4,077,746 | 3/1978 | Reynolds | 60/419 X |
| 5,035,170 | 7/1991 | Stroze et al. . | |

FOREIGN PATENT DOCUMENTS

| | | |
|---|---|---|
| 1146128 | 11/1957 | France . |
| 1303925 | 1/1963 | France . |
| 1200071 | 1/1965 | Germany . |
| 2915620 | 10/1980 | Germany . |

*Primary Examiner*—John E. Ryznic
*Attorney, Agent, or Firm*—Jeffrey D. Myers

[57] ABSTRACT

The invention relates to a pressure transformer for the conversion of a hydraulic power from a first fluid flow having a first pressure into the hydraulic power of a second fluid flow having a second pressure. In the housing (3) a rotor (26) is mounted, able to rotate around a rotation shaft (4) due to the effect of the pressure differences between the three pipe connections (16). Around the rotation shaft chambers (24) are distributed comprising displacement means (27, 29) such as pistons (27) which, when the rotor (26) in the housing (3) rotates, vary the volume in the chambers (24) between a minimum and a maximum value, and channels (19, 22) provided with valves (20, 21) activated by the rotation of the rotor (26) and connecting each chamber (24) alternately with the first, the second and the third pipe connection (16).

11 Claims, 5 Drawing Sheets

PRESSURE TRANSFORMER

Figure 1:
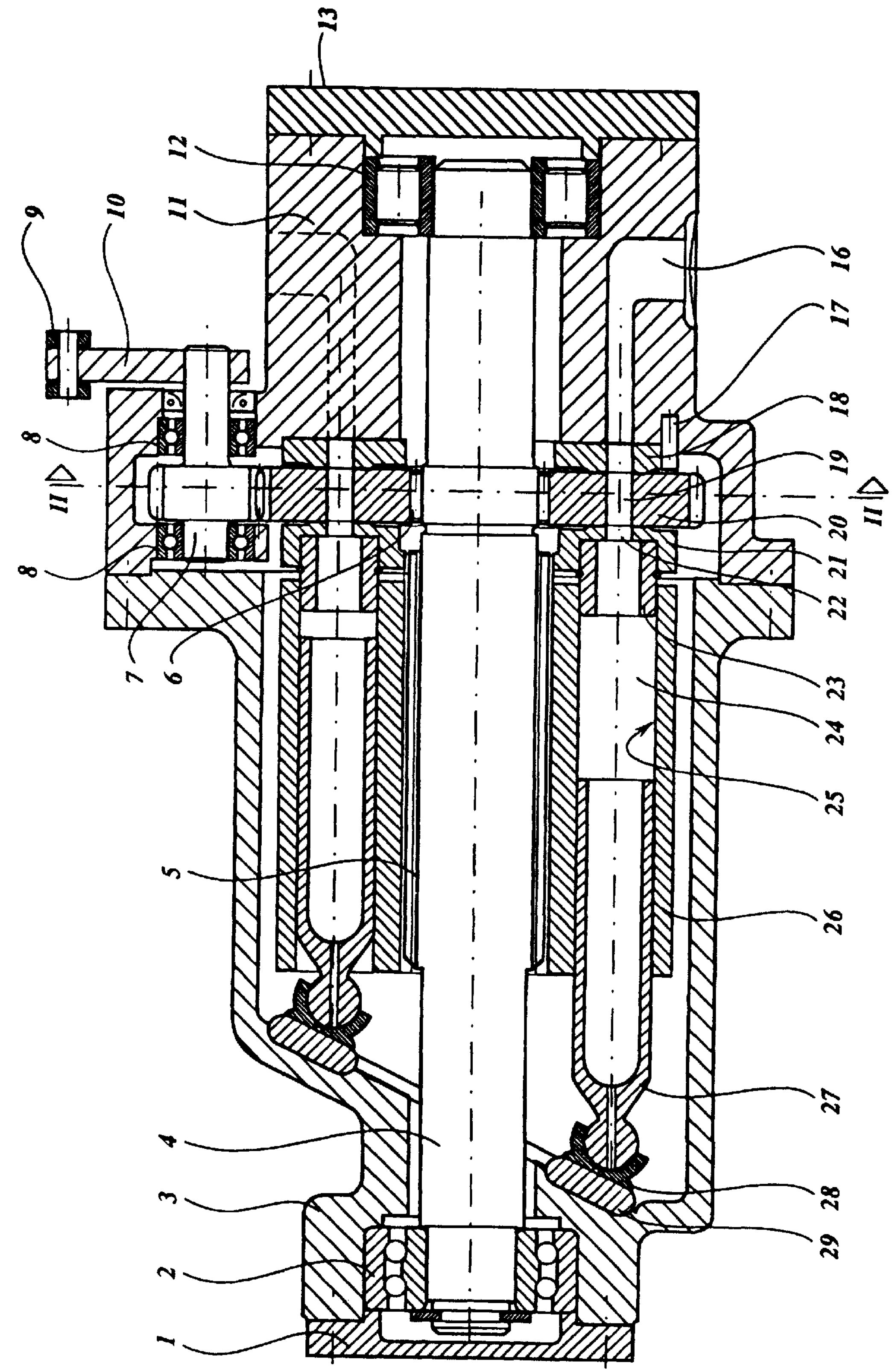

The invention relates to a hydraulic pressure transformer in accordance with the preamble of claim 1.

Such a hydraulic pressure transformer is known from U.S. Pat. No. 4,077,746, Reynolds, in which a hydraulic pressure transformer is used to load a hydraulic accumulator with hydraulic fluid of a higher pressure than the pressure of the hydraulic fluid supplied to the hydraulic transformer. In the known hydraulic pressure transformer, the rotational speed of the rotor is limited by a flow restricting orifice.

Due to this flow restricting orifice, the pressure in a first port is lowered so that the pressure differences over the first port and a second port is in inverse ratio to the length of this first port and the length of the second port. This lowering of pressure over the orifice brings a loss of energy and reduces the efficiency, however, it is clear that in the known apparatus such flow restrictions are the only way to adapt to the varying pressure differences. The objective of the invention is to make a hydraulic pressure transformer with which fluid flows of a first pressure can be converted almost without loss of power into a fluid flow of a second pressure, whereby the first and/or the second pressure may vary indepedently.

In accordance with the invention, adjusting means are provided for adjusting the rotative position of the drive means with respect to an opening position of the valves.

By adjusting the position of the drive means relative to the opening positions of the valves, the first pressure and/or the second pressure can be varied independently without loss of power.

From U.S. Pat. No. 5,035,170 a hydraulic apparatus is known with varying displacement capabilities by means of electrically rotating a port plate with two slots that cooperates with the cylinders in the hydraulic apparatus. The aim of rotating the port plate is to vary displacement of the hydraulic apparatus, which aim is different from the problem solved with the apparatus according to the invention.

In accordance with a further improvement of the invention, the rotative position of the drive means is adjustable with respect to the housing and the opening position of the valves is fixed with respect to the housing by the adjusting means. This embodiment permits the construction to be simple and affords a quickly reacting adjustment of the pressure ratios; this is partly due to the fact that relatively little force is required for the adjustment, as only the forces in the valves play a role and these forces are much weaker than the forces involved with, for instance, the drive means. This vastly increases the response speed, something that is very important for many applications.

According to an embodiment of the invention, the chambers connect via one of at least three channels through a face plate with one of the pipe connections and the rotative position of the face plate in the housing is adjustable. By using an adjustable face plate with channels each connected to one of the pipe connections easy and quick adjustable valves are provided.

In accordance with a further improvement, the face plate in the housing is rotatable with the aid of the adjustment means, thereby making quick adjustments possible with little power requirement.

According to another improvement of the hydraulic pressure transformer in accordance with the invention in which the adjusting means are directed by a control and which is connected to a hydraulic motor, the control is connected to a pressure sensor placed in the pipe connection between the hydraulic motor and the hydraulic pressure transformer.

In this way the control can immediately adjust the setting of the hydraulic pressure transformer to match the motor load, thereby preventing that due to the altered pressure ratio the rotor rotates too quickly or stops, either of which would result in undesirable operating conditions.

Further the invention relates to an improvement of a hydraulic pressure transformer in which the face plate has three channels between which a rib is provided, which rib during rotation of the rotor is able to seal a channel leading to a chamber. This absolute seal is necessary in order to avoid short circuiting between the different pipe connections, and usually the rotor is provided with an extra angle of rotation affording an absolute seal to limit leakage losses. As soon as after sealing the chamber comes into contact with the next channel, the pressure in the chamber suddenly changes because said channel has a completely different pressure level. This causes a loud noise, which is undesirable.

In order to avoid the above-mentioned disadvantages in the hydraulic pressure transformer in accordance with the invention, the rib is dimensioned such that the chamber is completely sealed over a rotor rotation of not more than 2°. The dimensions of the ribs are preferably such that a rotation of about 1° seals the openings.

This achieves that during a short period of time the chamber is sealed, while rotation of the rotor causes a change of volume in the chamber. The change of volume is always such that the pressure in the chamber, which was the same as in the pressure connection just sealed, increases or decreases through the effect of the displacement means caused by the rotation, and to emulate the pressure prevailing in the pressure connection to be opened. Choosing the proper width of the rib in accordance with the invention achieves that the pressure in the chamber is about the same as the pressure in the pressure connection to be opened, greatly decreasing the noise nuisance.

According to a further improvement the hydraulic pressure transformer in accordance with the invention is assembled on a hydraulic motor and preferably on a linear cylinder. This makes it possible that the pipes between the hydraulic pressure transformer and the motor are short, as a result of which there is less resilience in the oil column, and the hydraulic transient ensuing from the resilience, is prevented as much as possible. Since the hydraulic transient is detrimental to the quiet running of the rotor under the influence of the different oil pressures in the pipe connections, it is the combined assembly which achieves that the rotor runs more quietly in all load situations.

The invention is also embodied in a hydraulic system comprising a hydraulic pump for generating a fluid flow having an essentially constant primary pressure and a hydraulic pressure transformer for converting the fluid flow of the primary pressure into a fluid flow of a secondary pressure.

Such a system is known from U.S. Pat. No. 3,188,963, in which an intensifier is shown between a pump and a cylinder. In the known system, the pressure to the cylinder is maintained at a constant level by using a throttling valve in the inlet of the intensifier. This throttling reduces the efficiency of the intensifier. In order to overcome this disadvantage, in the system according to the invention the hydraulic pressure transformer is provided with control means for changing its settings thereby controlling the flow to a user of the secondary pressure.

By changing the setting of the hydraulic pressure transformer, a loss-free adaptation to the primary and secondary pressures is obtained.

The invention also relates to a hydraulic system comprising a hydraulic pump for generating an oil flow at its outlet, at least one user connected to the hydraulic pump and a tank for receiving the used oil from the user.

In many hydraulic systems comprising, for instance, high-speed pumps the situation arises where, for example, the inlet of the pump is provided with a low pressure of for instance 5 bar in order to prevent that cavitation occurs in the pumps, motors and in other components. The pressure in the tank is usually the atmospheric pressure, because one works with open tanks in which the fluid is collected. A problem in such systems is that the oil flow must be brought from the pressure in the tank to the inlet of the pump while incurring the least possible loss, as this oil flow concerns the entire oil flow. The known systems use separate pumps for this, the control of these pumps being complicated in order to restrict the losses.

It is the object of the invention to improve the efficiency of the hydraulic system in a simple way. To this end a hydraulic transformer is connected to the inlet of the hydraulic pump, the tank and the outlet of the hydraulic pump and is adjusted for providing an oil pressure at the inlet of the hydraulic pump which is higher than the pressure in the tank. Due to the fact that the hydraulic transformer reacts immediately to fluid being drawn in by the pump, and the rotor, due to the reduction of the pressure, immediately reaches full revolutions as a result of the altered pressure ratios, no additional control is required, and a relatively low-cost, no-loss oil supply is achieved.

Figure 2:
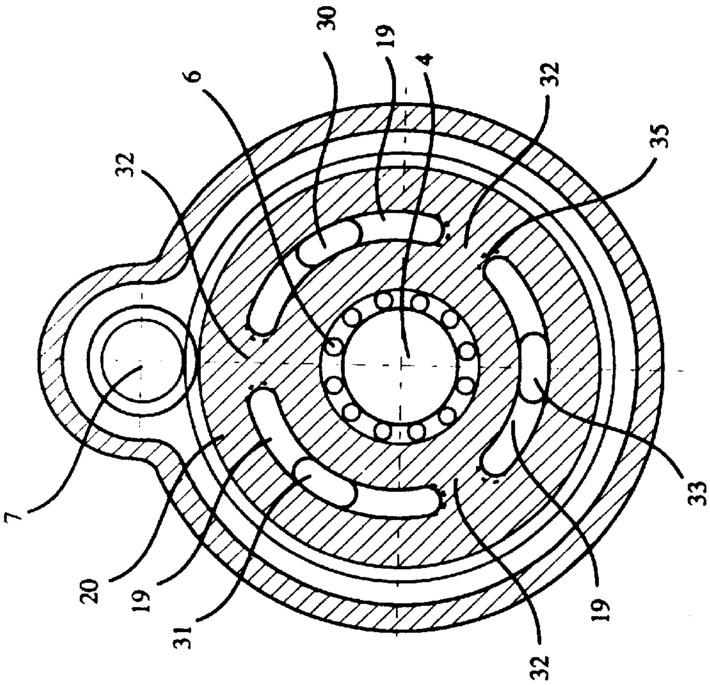
Figure 11:
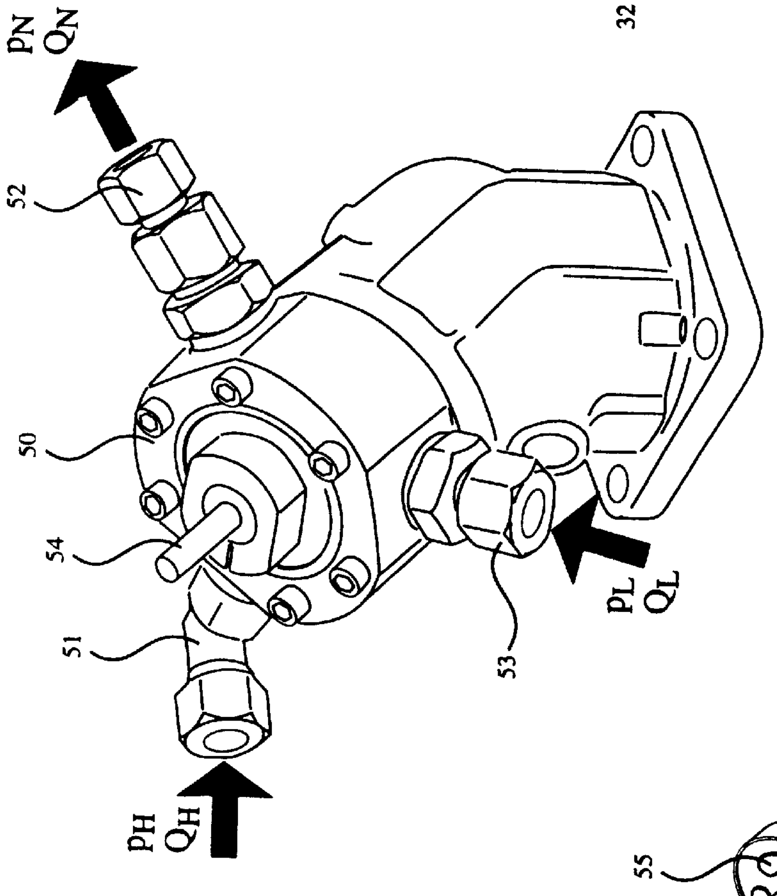
Figure 12:
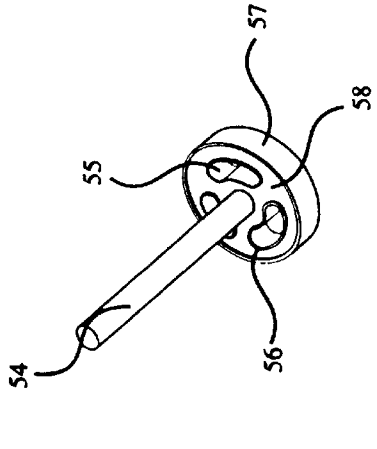
Figure 3:
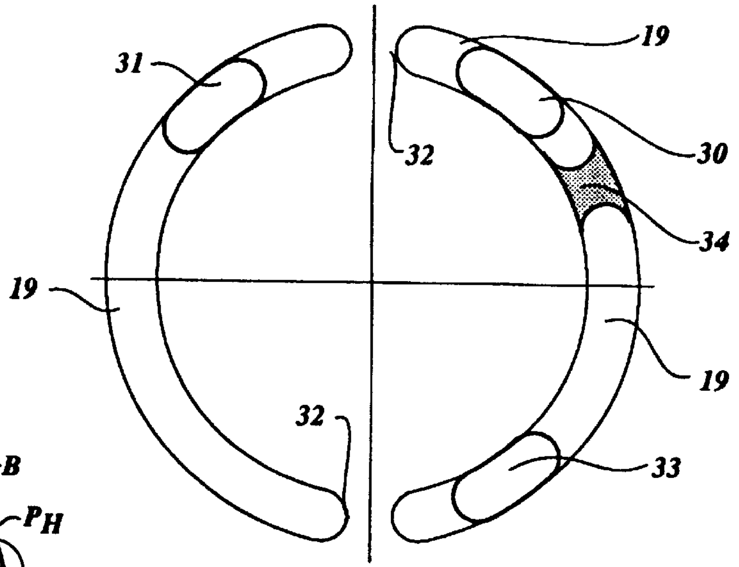
Figure 7:
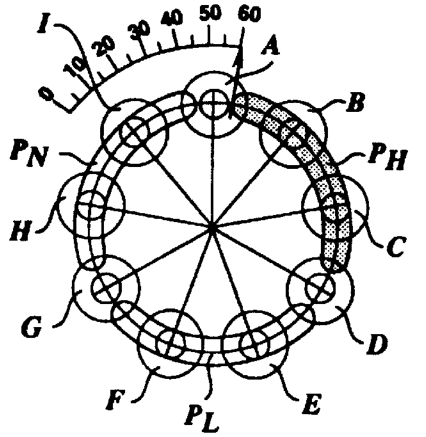
Figure 8:
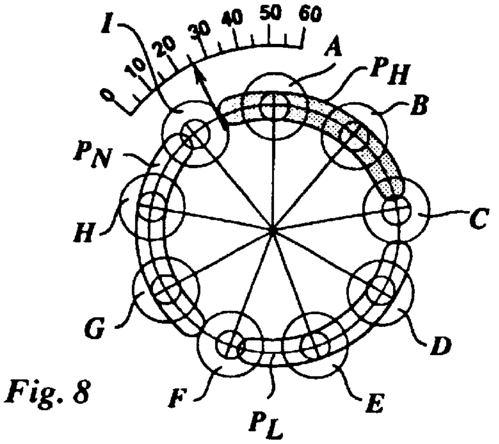
Figure 9:
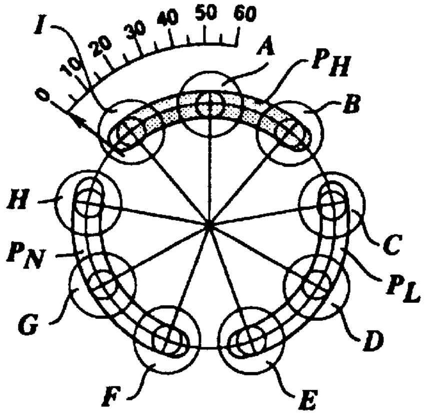
Figure 10:
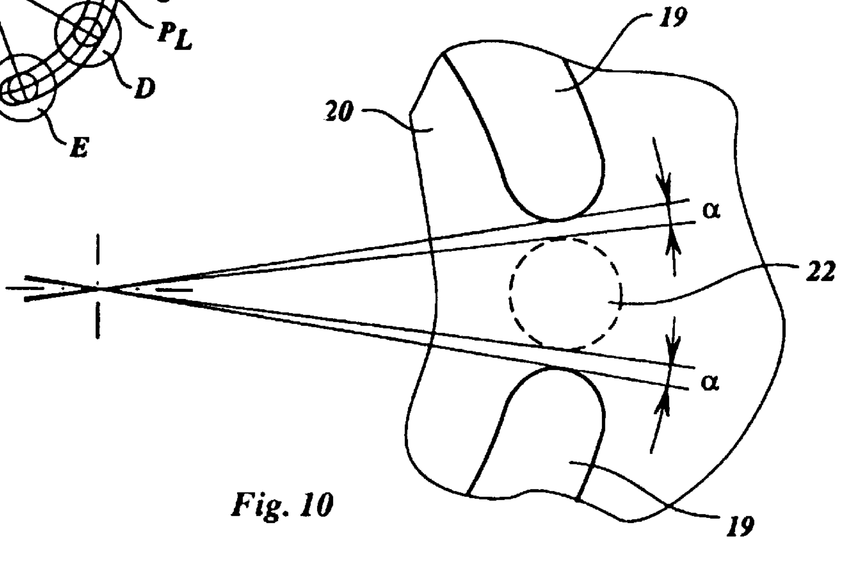
Figure 4:
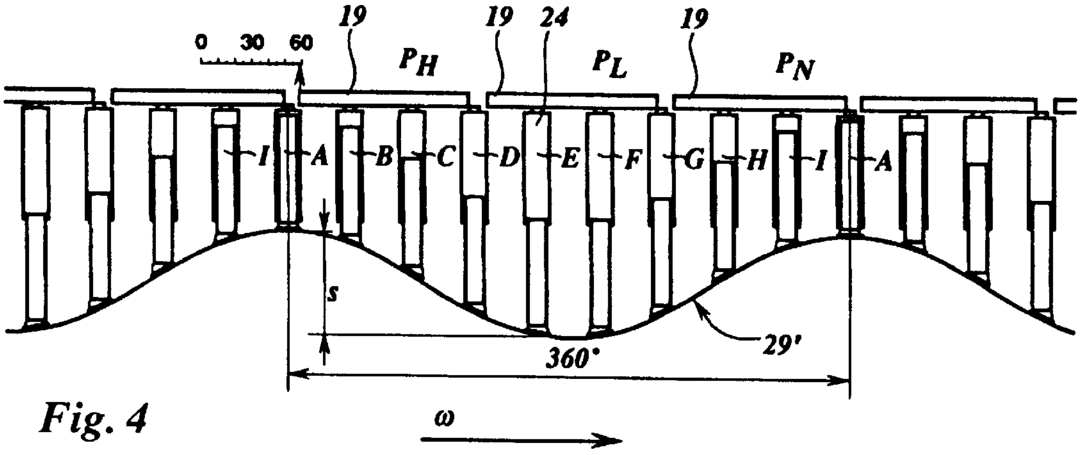
Figure 5:
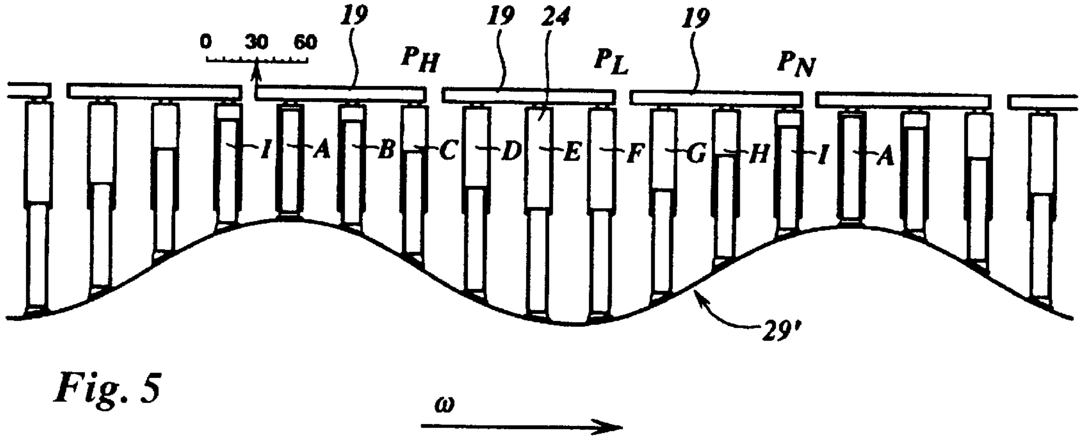
Figure 6:
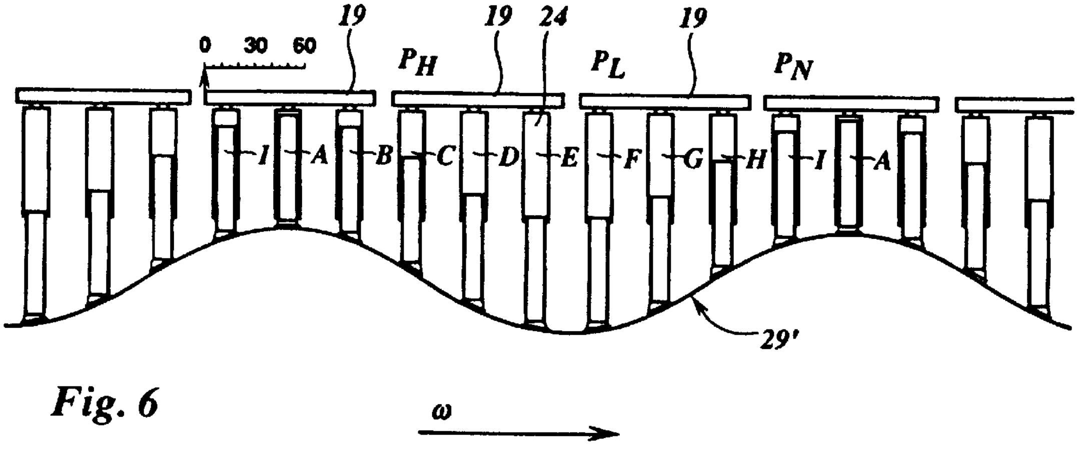
Figure 13:
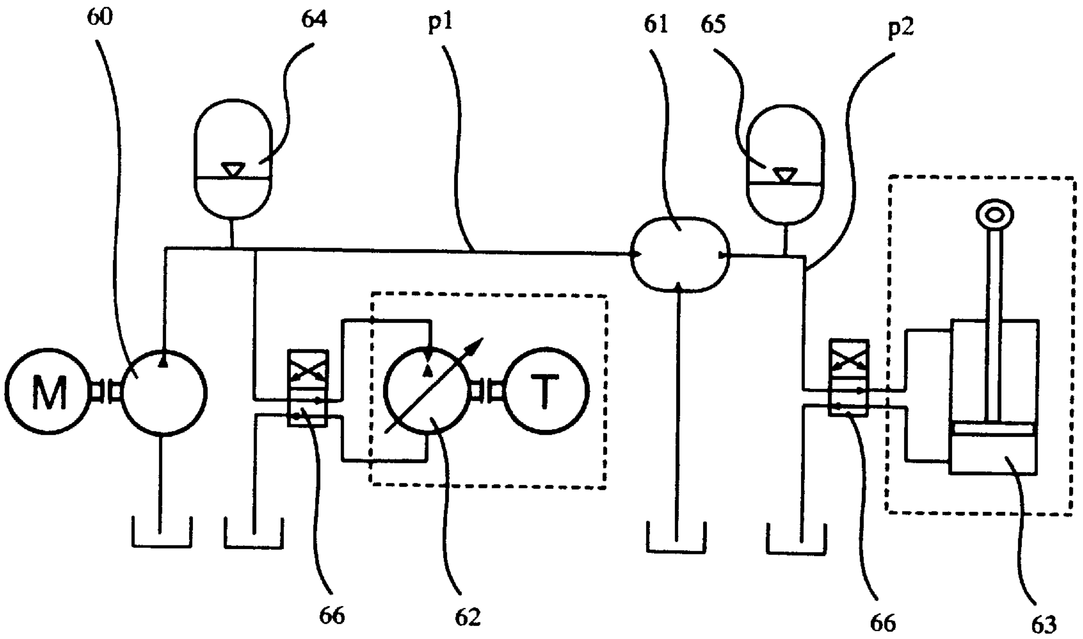
Figure 14:
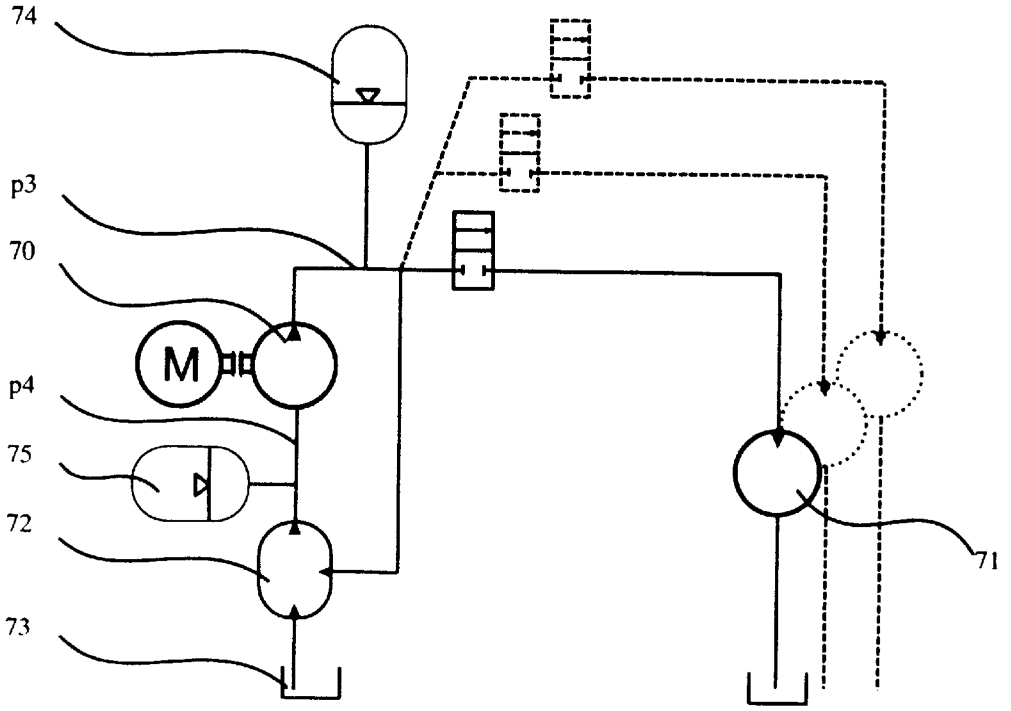

The invention will be elucidated in the specification below, describing a few examples of embodiments with reference to the drawing, in which:

FIG. 1 shows a schematic cross-section of a first embodiment of the hydraulic transformer in accordance with the invention, FIG. 2 shows the section II—II of the hydraulic transformer in accordance with FIG. 1, FIG. 3 shows an alternative embodiment of the valves in accordance with FIG. 2, FIG. 4 shows schematically the chamber volumes of the hydraulic transformer in accordance with FIG. 1 with the high pressure and the effective pressure being more or less the same, FIG. 5 shows schematically the chamber volumes of the hydraulic transformer in accordance with FIG. 1 with the high pressure being higher than the effective pressure, FIG. 6 shows schematically the chamber volumes of the hydraulic transformer in accordance with FIG. 1 with the effective pressure and the low pressure being more or less the same, FIGS. 7, 8 and 9 show schematically how the chambers are connected with the various compressed air connections in the situations shown in the FIGS. 4, 5 and 6 respectively, FIG. 10 shows schematically the dimensions of the rib between the openings in the face plate in accordance with FIG. 2, FIG. 11 shows a perspective view of a second embodiment of a hydraulic transformer in accordance with the invention, FIG. 12 shows a perspective view of the face plate of the hydraulic transformer in accordance with FIG. 11, FIG. 13 shows a flow diagram of the hydraulic system with a hydraulic transformer for the decrease of the pressure, and FIG. 14 shows a flow diagram of the hydraulic system with a hydraulic transformer for the increase of the pressure.

Identical parts in the drawing are indicated as much as possible by corresponding reference numbers.

FIG. 1 shows a first embodiment of a hydraulic transformer. A shaft 4 is supported by a bearing 2 and a bearing 12. The bearing 2 is fixed in a housing 3, by means of a lid 1, the bearing 12 is fixed in a housing 11, by means of a lid 13. The housing 3 and the housing 11 are assembled in known manner. The shaft 4 is provided with splines 5 for coupling a rotor 26 and a rotating sealing plate 21 slidably in the direction of the shaft 4.

The rotor 26 is provided with nine cylinder bores 25 in which a sealing plug 23 is sealingly provided between the rotating sealing plate 21 and the rotor 26. Each bore 25 is provided with a piston 27 which has a piston shoe 28 supported by a tilting plate 29. The piston 27 together with the bore 25 form a volume-variable pump chamber 24 connected by means of a channel 22 with an opening 19 in a face plate 20. The face plate 20 is provided with three openings 19, each connecting to an opening in a stationary sealing plate 18 fixed in the housing 11 and having a key peg 17 to ensure that each of the three openings in the stationary sealing plate 18 are positioned for a pressure connection 16.

The face plate 20 is rotatably mounted on the shaft 4 by means of a bearing 6. The circumference of the face plate 20 is provided with toothing engaging the toothing on a pinion shaft 7. The pinion shaft 7 is mounted in bearings 8 and can be rotated by means of a lever 10 which is movable by means of an adjusting mechanism 9. As can also be seen in FIG. 2, the openings 19 are separated from each other by a rib 32, the first opening 19 being connected with a high-pressure channel 30, the second opening 19 to an effective-pressure channel 31 and the third opening 19 to a low-pressure channel 33.

Furthermore, the appliance incorporates all the known measures and construction details know from conventional hydraulic components such as pumps. This involves, for instance, the measures necessary for greasing and leakage oil drainage. Sealing at the face plate 20 between the rotor 21 and the housing is also carried out in the usual manner.

In order to keep the rate of flow in the channels 30, 31 and 33 as low as possible the area of the opening 19 at the side of the compressed air connection 16 is larger than at the side of the pump chambers 24. This can be done in the manner shown in FIG. 2 at 35, by narrowing the rib 32 at the side of the pressure connection 16 plus the openings may optionally be widened.

FIG. 3 shows an alternative embodiment of the place flate 20, in which instead of rotating the face plate 20, a movable rib 34 is used.

In the embodiment shown in FIG. 1, the shaft 4 may be connected in the conventional manner with a sensor (not shown) measuring the direction and speed of the rotor's rotation, which data are processed in a control (not shown) and which controls the position of the face plate 20. The control of the hydraulic transformer functions such that the energy supplied to the rotor 26, that is to say the product of pressure and volume flow, corresponds with the energy taken from the rotor 26, possibly of a different pressure and volume flow, the difference in the volume flow being supplied or removed via a third, usually low pressure level. For this purpose the forces exerted on the rotor must be in balance, similarly, the mass balance of the fluid flows must be appropriate, both depending on the adjustment of the face plate.

FIGS. 4 to 9 show the various situations of use of the hydraulic transformer with the relevant adjustments of the face plate 20 and the openings 19, where in FIGS. 4 and 7 an effective pressure $P_N$ and a high pressure $P_H$ are about the same, in FIGS. 5 and 8 the effective pressure $P_N$ is lower than the high pressure $P_h$ and in the FIGS. 6 and 9 the effective pressure $P_N$ is about the same as a low-pressure $P_L$. The various pump chambers 24 are indicated by A-I, while the line 29' indicates the influence of the tilting plate 29 on the volume of the pump chamber 24 and 8 in a maximum stroke. The direction of movement ω indicates the movement of the pump chambers 24 along the tilting plate 29 when oil is supplied at the $P_N$ side. One can see how for the same pressure connection the volume of the pump chambers 24 can both increase and decrease, this can be regulated by adjusting the face plate 20. This is shown, for instance, in FIG. 5 at the high-pressure connection $P_H$, where with the direction of movement ω, the volume of the pump chamber 24 decreases at I to the minimum value at A, and subsequently increases.

In FIG. 10 face plate 20 is drawn with the rib between the openings 19. As shown, the rib is larger than the diameter of the chamber opening 22, so that during a small portion of the rotation, being in total twice an angle α, the chamber is sealed. This angle α measures preferably 0.5 degrees in order to prevent hydraulic transient and cavitation. For special applications this angle α may be increased to about 1 degree.

In the first embodiment of the hydraulic transformer discussed above, pistons are movable in a cylinder and they move in the direction parallel to the rotation shaft. The invention can also be applied in other configurations of pistons and cylinders such as, for instance, where the piston's direction of movement forms an angle with or runs perpendicular to the rotation shaft. It is also possible to have the pistons and cylinders move eccentrically in relation to each other.

The face plate shown in the embodiment is provided with three openings and there are three pressure connections. In special applications it is also possible to use the four or more pressure connections, there will then also be more openings.

Instead of the face plate having three openings it is also possible to apply multiples of three, such as six openings. Instead of the face plate there are also other possibilities for sealing the channels to the pump chambers, such as, for instance, by means of electrically operated valves which are controlled by the rotation of the rotor.

In the respective embodiment the pistons are moved in and out of the pump chambers by means of a tilting plate. There are also embodiments of the hydraulic transformer, in parallel with the various embodiments existing of hydraulic pumps, in which the pistons are moved by means of cam disks or by a forced movement between the housing and the rotor.

Apart from the appliances in which use is made of pistons and cylinders, the invention is also applicable if the volume of the pump chambers is varied by other means. In this regard one might consider hydraulic transformers with pump chambers similar to the chambers used in vanes pumps.

FIG. 11 shows a hydraulic transformer 50 in which the pistons and the rotor containing the pump chambers rotate around different shafts so that the volume of the pump chambers varies when the rotor rotates. The rotation position of the face plate in relation to the housing can be adjusted with the aid of a shaft 54, thereby adjusting the pressure balance in the hydraulic transformer. The hydraulic transformer is provided with a high-pressure connection 51, where a fluid flow $Q_H$ flows into the hydraulic transformer under a pressure $P^H$. A fluid flow $Q_N$ leaves the hydraulic transformer under a pressure of $P_H$ at an effective pressure connection 52. The energy content of both flows is the same, therefore if $P_H > P_N$ then $Q_H < Q_N$. The difference between the two fluid flows is supplied at the low-pressure connection 53 at a pressure of $P_L$ and a fluid flow $Q_L$, so that $Q_L = Q_N - Q_H$. The pressure ratios are adjusted by rotation of the shaft 54. This shaft can be moved by means of a control system; it is also possible to maintain a fixed setting, so that the pressure ratio between $P_H$, $P_N$ and $P_L$ is fixed.

FIG. 12 shows the kind of face plate 57 used in the hydraulic transformer 50 in FIG. 11. The face plate 57 is provided with three openings 55 separated by ribs 58 having a sealing edge 56. The face plate 57 can be rotated around its axis by means of the shaft 54.

FIG. 13 shows an application of a hydraulic transformer 61. By means of a pump 60, oil is brought up to a pressure p1, p1 being for instance, 400 bar. This pressure is particularly suitable for a hydraulic motor 62 which can be operated by means of a valve 66 and/or by means of the adjustment of the stroke volume which may be available in the motor. Fluctuations in the oil pressure are absorbed by an accumulator 64. A linear drive 63 is suitable for a maximum pressure p2, p2 being for instance 180 bar. The linear drive 63 is operated by a valve 66 and an accumulator 65 is provided for the absorption of pressure fluctuations in the pressure p2. To lower the pressure p1 to p2, a hydraulic transformer 61 is applied, which hydraulic transformer may have a fixed setting, and may react without any further control to the fluid flow taken up by the linear cylinder. If the cylinder speed has to remain within certain limits, the hydraulic transformer 61 may be provided with a control.

FIG. 14 shows another application of a hydraulic transformer 72. Herein a high-speed pump 70 has a suction pressure p4 and an outlet pressure p3. The suction pressure p4 always has to be higher than a certain value, for instance 5 bar, as otherwise cavitation will develop in the pump 70. The suction pressure p4 is provided by a hydraulic transformer 72 which ensures that the pressure p3 is converted into said suction pressure p4 with oil being supplied from a tank 73. A small accumulator 75 is placed between the pump 70 and the hydraulic transformer 72 to level out the pressure fluctuations. Several users 71 can be accommodated at the pressure side of the pump, while the hydraulic transformer 72 can also react to the changing volume flow if the pump has a controllable delivery. Between the pump 70 and the hydraulic transformer 72 an accumulator 74 is placed.

Another application is lifting a variable load by means of a hydraulic cylinder to which the energy is supplied under a constant high pressure and used under a varying pressure. By measuring this pressure and the rotor's 26 direction of rotation by means of a sensor, the setting of the face plate 20 may be calculated in regard to the desired movement. It is also possible after reversal of the direction of movement, to reconvert the energy released through the effect of the load into a higher pressure than the pressure prevailing in the hydraulic cylinder and to recover said energy for reuse.

In the embodiments shown here, the hydraulic transformer has always been presented as a separate unit. In connection with saving expenses and improving the adjustment performance and possible instability, the hydraulic transformer may be combined with a hydraulic motor. This improves the ability to accommodate load fluctuations, while at the same time the different hydraulic motors are, linearly of rotatingly, connected with a fluid network having a constant high pressure.

What is claimed is:

1. A hydraulic pressure transformer for the conversion of a hydraulic power from a first fluid flow having a first pressure into the hydraulic power of a second fluid flow having a second pressure by supplying or discharging a third fluid flow having a third pressure comprising a housing having at least three pipe connections for the connection of the fluid flows with the hydraulic pressure transformer, a rotor freely rotatable in the housing around a rotation shaft, chambers distributed around the rotation shaft and provided with displacement means coupled to drive means for during rotation of the rotor moving the displacement means relative to the chambers thereby varying the volume in the chambers between a minimum and a maximum value, said displacement means exerting a force on the rotor depending on the pressure in the chamber, said force creating a driving torque on the rotor depending on the rotative position of the chamber relative to the drive means, and channels provided with valves activated by the rotation of the rotor and alternately connecting each chamber with one of the pipe connections, characterized in that adjusting means are provided for adjusting the rotative position of the drive means with respect to an opening position of the valves.

2. A hydraulic pressure transformer in accordance with claim 1, characterized in that the rotative position of the drive means is fixed with respect to the housing and the opening position of the valves is adjustable with respect to the housing by means of the adjusting means.

3. A hydraulic pressure transformer in accordance with claim 1 characterized in that via one of at least three channels through a face plate the chambers connect with one of the pipe connections and that the rotative position of the face place in the housing is adjustable.

4. A hydraulic pressure transformer in accordance with claim 3 characterized in that the face plate in the housing is rotatable with the aid of the adjustment means.

5. A hydraulic pressure transformer in accordance with claim 1 whereby the adjustment means are directed by a control and which is connected to a hydraulic motor characterized in that the control is connected to a pressure sensor placed in the pipe connection between the hydraulic motor and the hydraulic pressure transformer.

6. A hydraulic pressure transformer in accordance with claim 3 in which the face plate has three channels between which a rib is provided, which rib during rotation of the rotor can seal a channel leading to a chamber characterized in that the rib is dimensioned such that the chamber is completely sealed over a rotor rotation of not more than approximately 2°.

7. A hydraulic pressure transformer in accordance with claim 6 characterized in that the rib is dimensioned such that the chamber is completely sealed over a rotation of about 1°.

8. A hydraulic pressure transformer in accordance with claim 1 characterized in that the hydraulic pressure transformer is assembled on a hydraulic motor.

9. A hydraulic pressure transformer in accordance with claim 8 characterized in that the hydraulic motor comprises a linear cylinder.

10. A hydraulic system comprising a hydraulic pump for generating a fluid flow having an essentially constant primary pressure and a hydraulic pressure transformer according to one of the previous claims for converting the fluid flow of the primary pressure into a fluid flow of a secondary pressure characterized in that the adjusting means are provided with control means for controlling the flow to users of the secondary pressure.

11. A hydraulic system comprising a hydraulic pump for generating an oil flow at its outlet, at least one user connected to the hydraulic pump and a tank for receiving the used oil from the user characterized in that a hydraulic pressure transformer is connected to the inlet of the hydraulic pump, the tank and the outlet of the hydraulic pump and is adjusted for providing an oil pressure at the inlet of the hydraulic pump which is higher than the pressure in the tank.

* * * * *